United States Patent
Talwar et al.

(10) Patent No.: US 9,706,299 B2
(45) Date of Patent: Jul. 11, 2017

(54) PROCESSING OF AUDIO RECEIVED AT A PLURALITY OF MICROPHONES WITHIN A VEHICLE

(71) Applicant: GM Global Technology Operations LLC, Detroit, MI (US)

(72) Inventors: Gaurav Talwar, Novi, MI (US); MD Foezur Rahman Chowdhury, Troy, MI (US); Xufang Zhao, Windsor (CA)

(73) Assignee: GM Global Technology Operations LLC, Detroit, MI (US)

(*) Notice: Subject to any disclaimer, the term of this patent is extended or adjusted under 35 U.S.C. 154(b) by 296 days.

(21) Appl. No.: 14/207,929

(22) Filed: Mar. 13, 2014

(65) Prior Publication Data

US 2015/0264480 A1   Sep. 17, 2015

(51) Int. Cl.
| | | |
|---|---|---|
| H04R 3/00 | (2006.01) | |
| H04R 1/40 | (2006.01) | |
| G10L 15/20 | (2006.01) | |
| G10L 25/78 | (2013.01) | |
| G10L 21/0208 | (2013.01) | |

(52) U.S. Cl.
CPC .......... *H04R 3/005* (2013.01); *H04R 1/406* (2013.01); *G10L 15/20* (2013.01); *G10L 21/0208* (2013.01); *G10L 25/78* (2013.01); *H04R 2201/401* (2013.01)

(58) Field of Classification Search
CPC ..... H04R 3/005; G10L 21/0208; G10L 15/20; G10L 25/78
USPC ............. 381/92, 94.1–94.3, 94.7, 66, 83, 86
See application file for complete search history.

(56) References Cited

U.S. PATENT DOCUMENTS

| | | | | |
|---|---|---|---|---|
| 7,054,452 | B2 * | 5/2006 | Ukita .................. | H04N 7/15 348/E7.083 |
| 8,194,872 | B2 * | 6/2012 | Buck .................. | G10L 21/0208 381/71.11 |
| 8,917,884 | B2 * | 12/2014 | Matsuo ............... | H04R 3/005 381/309 |
| 9,026,436 | B2 * | 5/2015 | Liao ................... | H04R 3/005 381/73.1 |
| 2008/0175407 | A1 * | 7/2008 | Zhang ................. | H04R 3/005 381/92 |
| 2010/0158267 | A1 * | 6/2010 | Thormundsson ...... | H04R 3/005 381/92 |
| 2011/0075858 | A1 * | 3/2011 | Chihara ............... | H04R 3/005 381/92 |
| 2012/0106749 | A1 * | 5/2012 | Buck .................. | H04R 3/005 381/66 |
| 2012/0128166 | A1 * | 5/2012 | Kim ................... | H04R 3/005 381/58 |

(Continued)

*Primary Examiner* — Disler Paul
(74) *Attorney, Agent, or Firm* — Christopher DeVries; Reising Ethington P.C.

(57) ABSTRACT

A method of processing audio received at a plurality of microphones in a vehicle includes receiving the audio as a first audio stream and second audio stream at respective first and second microphones that are positioned at different locations within the vehicle; creating a first digital time series and a second digital time series that represent the first audio stream and the second audio stream, respectively; calculating a delay that exists between the first audio stream and the second audio stream based on a cross-correlation of the first digital time series and the second digital time series; and processing the received audio using the calculated delay.

10 Claims, 2 Drawing Sheets

(56) References Cited

U.S. PATENT DOCUMENTS

| | | | |
|---|---|---|---|
| 2012/0250882 A1* | 10/2012 | Mohammad | H04B 3/234 381/94.1 |
| 2013/0287224 A1* | 10/2013 | Nystrom | H04R 3/005 381/92 |
| 2015/0222996 A1* | 8/2015 | Chu | H04R 25/40 381/313 |

* cited by examiner

PROCESSING OF AUDIO RECEIVED AT A PLURALITY OF MICROPHONES WITHIN A VEHICLE

TECHNICAL FIELD

The present invention relates to receiving and processing sound via microphones within a vehicle cabin and, more particularly, to processing multiple audio streams received within the vehicle at multiple microphones positioned at different locations within the vehicle cabin.

BACKGROUND

Vehicles can interact with vehicle occupants using both audible and visual communications mechanisms. The vehicle can use a visual display to present information the vehicle occupant can see and optionally receive input when the vehicle occupant presses virtual buttons presented on the display. In addition, the vehicle can use an audio system to convey information to the vehicle occupant. The vehicle can then receive responses to the audibly or visually-conveyed information using one or more microphones. When the microphone receives responses in the form of speech, it may be accompanied by background or other noise that can interfere with the speech. For instance, when the audio system receives sound from two separately-located microphones, the sound received at one microphone may be different from the sound received at another microphone. Combining the signals from each microphone can result in unwanted noise output through speakers of the audio system. Reconciling the differences in sound received from one microphone with the sound received from another microphone can produce a clearer output through speakers of the audio system.

SUMMARY

According to an embodiment of the disclosure, there is provided a method of processing audio received at a plurality of microphones in a vehicle. The method includes receiving the audio as a first audio stream and second audio stream at respective first and second microphones that are positioned at different locations within the vehicle; creating a first digital time series and a second digital time series that represent the first audio stream and the second audio stream, respectively; calculating a delay that exists between the first audio stream and the second audio stream based on a cross-correlation of the first digital time series and the second digital time series; and processing the received audio using the calculated delay.

According to an embodiment of the disclosure, there is provided a method of processing audio received at a plurality of microphones in a vehicle. The method includes receiving audio within a vehicle, including receiving the audio as a first audio stream and second audio stream at respective first and second microphones that are positioned at different locations within the vehicle; converting the first audio stream and second audio stream into a first digital time series and a second digital time series, respectively; calculating a delay that exists between the first digital time series and the second digital time series using a cross-correlation between the first digital time series and the second digital time series; and sending the calculated delay to a digital signal processor to remove unwanted noise from the audio.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below receives an audio stream of sound at a plurality of microphones, models the audio stream received at each microphone as a time series based on the output of the microphone, and uses cross-correlation techniques to identify a time lag or delay between the modeled time series or between the audio streams received at each microphone. A filter can then be applied to the combined output of the plurality of microphones representing the audio streams to remove the delay and/or the unwanted audio added by the time lag. Other techniques have been used to identify the time lag between audio streams received at the plurality of microphones, such as calculating a phase delay or phase shift between the audio systems. But the phase shift may not be an accurate representation of the time delay. For narrow band signals, phase difference between two signals may provide a fairly accurate estimate of potential time delay between the two. However, in case of the wideband signals, measurement may be more challenging because of potential noise in high frequency bins that is probably not statistically independent. In addition, a telecommunications network can be affected by factors that can add bias to the phase difference estimates and thus to time delay estimates. One of the known issues is noise at the receiver end typically due to scattering of Wideband audio signals. In contrast, applying a cross correlation function to the time series created or modeled from the output of each microphone representing the received audio stream can more accurately determine time lag or time delay between each audio stream received at each microphone.

Communications System—

Figure 1:
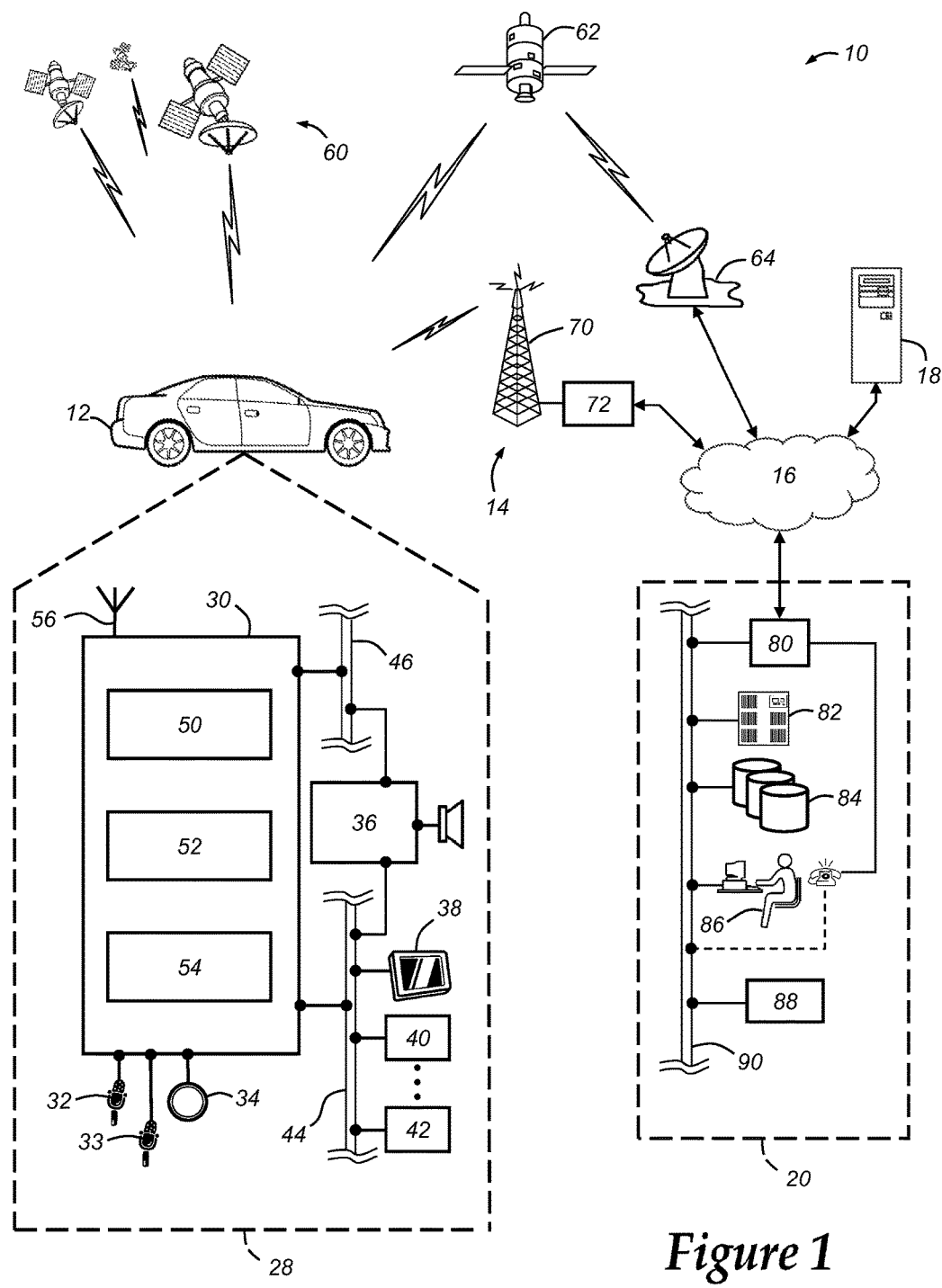
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible, Vehicle electronics 28 also includes a number of vehicle user interfaces that provide vehicle occupants with a means of providing and/or receiving information, including a first microphone 32, a second microphone 33, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. The first microphone 32 and second microphone 33 provide audio input to the telematics unit 30 to enable the driver or other occupant to provide voice commands and carry out hands-free calling via the wireless carrier system 14. For this purpose, it can be connected to an on-board automated voice processing unit utilizing human-machine interface (HMI) technology known in the art. In one embodiment, the first microphone 32 and the second microphone 33 can be active noise cancellation (ANC) microphones. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
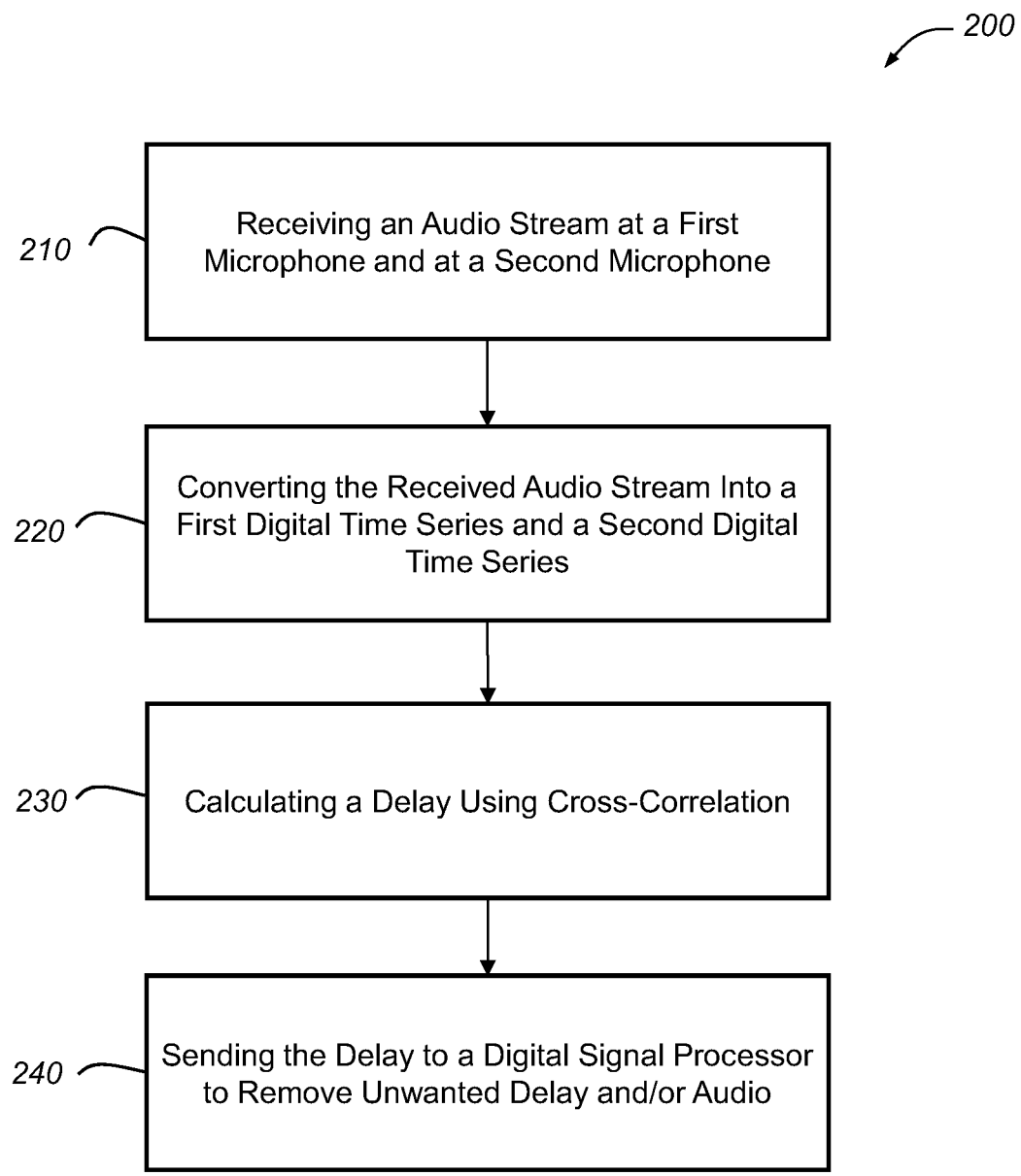
FIG. 2 is a flow chart depicting an embodiment of a method of removing unwanted noise from received sound.

Turning now to FIG. 2, there is shown a method 200 of removing unwanted noise from received sound. The method 200 begins at step 210 by receiving at the first microphone 32 located in the vehicle 12 an audio stream including speech from a vehicle occupant. For example, a vehicle occupant can be speaking into the microphone 32 at the vehicle 12 as part of a hands-free telephone call. The microphone 32 may be located closest to the vehicle occupant relative to other microphones located within the vehicle 12 and therefore the first to receive the speech of the vehicle occupant. The sound or speech received by the microphone 32 can be referred to as an audio stream that can then be converted into output from the microphone 32 in the form of an electric signal of varying voltage levels. The audio stream can also be received at the second microphone 33 located apart from the first microphone 33 in the vehicle 12. It is possible that the second microphone 33 is located further away from the vehicle occupant than the first microphone 32. Thus, when the second microphone 33 receives the audio stream it does so after the first microphone 32. In addition, the audio stream received by the second microphone 33 may include additional elements of sound that can result from the audio stream interacting with surfaces in the vehicle 12 such that the audio stream is impeded in a way that audio received at the first microphone 32 was not. For example, when the vehicle occupant speaks and is nearest the first microphone 32, very little may interfere with sound in between the occupant and the first microphone 32. However, the second microphone 33 may receive the audio stream slightly later due to its more remote location relative to the occupant and possibly only after at least part of it has reflected off of surfaces in the vehicle 12, such as instrument panels, ceiling material, and/or other occupants. Also, either or both of the first and second audio streams may include an echo, such as where a vehicle occupant's speech is received at a microphone both directly and as an echo off a vehicle interior surface. Thus, the audio stream received at the second microphone 33 may include additional sound (echo or other forms of noise) or at a minimum a lag or delay that is undesirable and can reduce the quality of the output from microphones 32 and 33. The method 200 proceeds to step 220.

Apart from simple delay between the two audio streams, and noise in the form of an echo in one or both streams, the microphones or either of them may also pick up other noise, such as road surface noise, wind noise, or from operation of other vehicle components or systems, such as a climate control fan or windshield wipers. Techniques for identifying and removing or reducing such noise are known to those in the art and, as will be discussed below, can be used in conjunction with the determined delay between the two audio streams to reduce or eliminate such noise.

At step 220, the audio stream received at the first microphone 32 and the audio stream received at the second microphone 33 are converted into a first digital time series and a second digital time series, respectively. Using computing resources available at the vehicle 12, the output from the first microphone 32 and the second microphone 33 can be sampled to create a first and second digital time series. In one example of how this can be carried out, the first microphone 32 and the second microphone 33 can each communicate output to the vehicle telematics unit 30. The processor 52 can then sample the output of the first microphone 32 and the second microphone 33 to create a first digital time series and a second digital time series. The first and second digital time series can then be saved in a memory device located at the vehicle 12, such as memory 54. The method 200 proceeds to step 230.

At step 230, a delay between the first digital time series and the second digital time series is calculated by evaluating a cross-correlation between the first digital time series and the second digital time series. The computing resources of the vehicle 12 can use the first digital time series and the second digital time series to calculate a time lag or delay between the audio stream received at the first microphone 32 and the audio stream received at the second microphone 33 by applying cross-correlation techniques. In one example of the cross-correlation techniques, samples of the first digital time series and the second digital time series samples can be modeled by a cross-correlation function (ccf) that is a function of lag or delay between the first and second digital time series. The ccf can be defined by a cross-covariance function (ccvf) as follows when N represents the number of data points in the first and second digital time series and $u_t$ and $y_t$ represent the first and second digital time series, respectively.

$$c_{uy}(k) = \frac{1}{N}\sum_{t=1}^{N-k}(u_t - \bar{u})(y_{t+k} - \bar{y}) \quad [k = 0, 1, \ldots, (N-1)]$$

$$c_{uy}(k) = \frac{1}{N}\sum_{t=1-k}^{N-k}(u_t - \bar{u})(y_{t+k} - \bar{y}) \quad [k = -1, -2, \ldots, -(N-1)]$$

$\bar{u}$ and $\bar{y}$ can represent the sample means while k may represent the time delay or tag The ccf can be the ccvf scaled or normalized by the respective variances of the first and second digital series and be represented by:

$$r_{uy}(k) = \frac{c_{uy}(k)}{\sqrt{c_{uu}(0)c_{yy}(0)}}$$

where $c_{uu}(0)$ and $c_{yy}(0)$ are the sample variances of $u_t$ and $y_t$. Calculations such as these can be made by the processor 52 of the vehicle telematics unit 30. For example, the processor 52 could access software, such as MATLAB, and execute built-in functions of that software using established commands. Using MATLAB as an example, the processor 52 can use the "FINDDELAY" command of MATLAB to provide the first and second digital time series from memory 54 and identify the lag or delay between the audio stream received at the first microphone 32 and the audio stream received at the second microphone 33. The method 200 proceeds to step 240.

At step 240, the calculated delay or lag is sent to a digital signal processor which can process the received audio (e.g., the first and second time series or other digital representations of the first and second audio streams) to improve the quality of the audio before carrying out automated speech recognition or before sending it from the vehicle over the wireless communication system 14 or otherwise. The processing can include using known or other noise filtering functions that remove the echo or other included noise in the received audio, and this can be done as is known to those skilled in the art using the calculated delay. And, having identified the amount of lag or delay between the first and second digital time series or the audio streams received at the first microphone 32 and the second microphone 33, the processor 52 can then eliminate the lag from the combined output of the first and second microphones 32, 33 and provide a lag-less or delay-less audio signal to the audio system 34. The digital signal processor can be incorporated into the electronics of the vehicle telematics unit 30 or can be an separate device accessible by the processor 52 of the vehicle telematics unit 30. For example, the digital signal processor can provide an adaptive filter that effectively cancels the lag or delay added by the second microphone 33. In one implementation, the digital signal processor can be a model TMS320 digital signal processor chip using Code Composer Studio (CCS) libraries each available from Texas instruments to code and design an appropriate filter (adaptive) for removing the lag or delay from the microphone output. While the method 200 has been described with respect to two microphones, it is possible to apply the method and system described herein to additional microphones. For instance, the audio stream can be received by three, four, or even more microphones and the method 200 can remove the lag or delay of the resulting audio combined from these microphones. Moreover, the method 200 has been described in a vehicular environment, but it is possible that the method 200 can be implemented in other environments as well. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of processing audio received at a plurality of microphones in a vehicle, comprising the steps of:
    (a) receiving audio within a vehicle, including receiving the audio as a first audio stream and second audio stream at respective first and second microphones that are positioned at different locations within the vehicle;
    (b) sampling outputs of the first and second microphones to create a first digital time series and a second digital time series that represent the first audio stream and the second audio stream, respectively;
    (c) calculating a delay that exists between the first audio stream and the second audio stream based on a cross-correlation of the first digital time series and the second digital time series; and
    (d) removing delay from the first audio stream by processing the received audio using the calculated delay.

2. The method of claim 1, wherein the first and second microphones are active noise-cancelling (ANC) microphones.

3. The method of claim 1, wherein step (d) further comprises removing noise from the received audio using a digital signal processor that carries out at least one noise filtering function using the calculated delay and digital representations of the first and second audio streams.

4. The method of claim 1, further comprising the step of sending from the vehicle over a cellular communication system audio data generated by the processing of step (d).

5. The method of claim 1, wherein the first audio stream and the second audio stream are received at the microphones as speech uttered by an occupant of the vehicle during a hands-free calling session.

6. The method of claim 1, wherein step (b) further comprises creating the first digital time series and the second digital time series at least in part by sampling of the first and second audio streams, respectively.

7. A method of processing audio received at a plurality of microphones in a vehicle, comprising the steps of:
    (a) receiving audio within a vehicle, including receiving the audio as a first audio stream and second audio stream at respective first and second microphones that are positioned at different locations within the vehicle;
    (b) converting the first audio stream and second audio stream into a first digital time series and a second digital time series, respectively;
    (c) calculating a delay that exists between the first digital time series and the second digital time series using a cross-correlation between the first digital time series and the second digital time series; and
    (d) removing unwanted noise from the first audio stream by sending the calculated delay to a digital signal processor.

8. The method of claim 7, wherein the microphones are active noise-cancelling (ANC) microphones.

9. The method of claim 7, further comprising the step of creating the first digital time series and the second digital time series at least in part by sampling of the first and second audio streams, respectively.

10. The method of claim 7, wherein the first audio stream and the second audio stream are received at the microphones as speech uttered by an occupant of the vehicle during a hands-free calling session.

* * * * *